(12) United States Patent
Chun et al.

(10) Patent No.: US 7,969,861 B2
(45) Date of Patent: Jun. 28, 2011

(54) METHOD OF TRANSMITTING CONTROL SIGNALS IN WIRELESS COMMUNICATION SYSTEM

(75) Inventors: Jin Young Chun, Anyang-si (KR); Moon Il Lee, Anyang-si (KR); Wook Bong Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 12/457,201

(22) Filed: Jun. 3, 2009

(65) Prior Publication Data

US 2009/0304098 A1    Dec. 10, 2009

Related U.S. Application Data

(60) Provisional application No. 61/059,788, filed on Jun. 8, 2008.

(30) Foreign Application Priority Data

Sep. 17, 2008 (KR) .................. 10-2008-0091136

(51) Int. Cl.
  *H04J 11/00* (2006.01)
(52) U.S. Cl. ......................................... 370/208
(58) Field of Classification Search .............. 370/203, 370/207, 208, 210
  See application file for complete search history.

(56) References Cited

U.S. PATENT DOCUMENTS

| | | | | |
|---|---|---|---|---|
| 7,869,402 B2 * | 1/2011 | Yoon et al. | .................. | 370/329 |
| 2007/0217362 A1 * | 9/2007 | Kashima et al. | .............. | 370/330 |
| 2008/0130612 A1 * | 6/2008 | Gorokhov et al. | ............ | 370/342 |
| 2008/0181181 A1 * | 7/2008 | Gorokhov et al. | ............ | 370/335 |
| 2008/0212464 A1 * | 9/2008 | Kim et al. | ..................... | 370/210 |
| 2009/0016231 A1 * | 1/2009 | Li et al. | ......................... | 370/252 |
| 2009/0046799 A1 * | 2/2009 | Li et al. | ......................... | 375/267 |
| 2010/0008315 A1 * | 1/2010 | Palanki et al. | ................ | 370/329 |
| 2010/0034165 A1 * | 2/2010 | Han et al. | ..................... | 370/330 |
| 2010/0202378 A1 * | 8/2010 | Youn et al. | .................... | 370/329 |

FOREIGN PATENT DOCUMENTS

WO    WO 2007/148946    12/2007

* cited by examiner

*Primary Examiner* — Chi H Pham
*Assistant Examiner* — Robert Lopata
(74) *Attorney, Agent, or Firm* — McKenna Long & Aldridge LLP (57) ABSTRACT

A method of transmitting control signals in a wireless communication system is provided. The method comprises allocating at least one control signal in a control channel region comprising a plurality of tiles, each tile consisting of a plurality of consecutive subcarriers in a frequency domain on a plurality of orthogonal frequency division multiplexing (OFDM) symbols in a time domain and transmitting the at least one control signal, wherein the number of the at least one control signal is determined based on the number of available sequences for the control channel region and the number of bit carried by each control signal.

20 Claims, 6 Drawing Sheets

METHOD OF TRANSMITTING CONTROL SIGNALS IN WIRELESS COMMUNICATION SYSTEM

CROSS-REFERENCE TO RELATED APPLICATIONS

This application claims the benefit of priority of U.S. Provisional Application No. 61/059,788 filed on Jun. 8, 2008, and Korean Patent Application No. 10-2008-0091136 filed on Sep. 17, 2008, which are incorporated by reference in their entirety herein.

BACKGROUND

1. Technical Field

The present invention relates to wireless communications, and more particularly, to a method of transmitting control signals on a control channel.

2. Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, standardization on the IEEE 802.16m is in progress as a new technical standard based on the IEEE 802.16e. The IEEE 802.16m, which is a newly developed technical standard, has to be designed to support the previously designed IEEE 802.16e. That is, a technology (i.e., IEEE 802.16m) of a newly designed system has to be configured to operate by effectively incorporating a conventional technology (i.e., IEEE 802.16e).

An orthogonal frequency division multiplexing (OFDM) system capable of reducing inter-symbol interference with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. To support these various schemes, control signals must be transmitted between a mobile station (MS) and a base station (BS). Examples of the control signals include a channel quality indicator (CQI) used when the MS reports a channel condition to the BS, an acknowledgement (ACK)/not-acknowledgement (NACK) signal that is a response for data transmission, and precoding information, antenna information, or the like used in a multiple antenna system.

Diversification of system functions results in increase in the number of types of control signals to be transmitted. When more control signals have to be transmitted with limited radio resources, an amount of radio resources to be used for a user is decreased to that extent.

Accordingly, there is a need for a method capable of effectively transmitting various control signals by using limited radio resources in an efficient manner.

SUMMARY

The present invention provides a method of effectively transmitting control signals.

According to an aspect of the present invention, a method of transmitting control signals in a wireless communication system comprises allocating at least one control signal in a control channel region comprising a plurality of tiles, each tile consisting of a plurality of consecutive subcarriers in a frequency domain on a plurality of orthogonal frequency division multiplexing (OFDM) symbols in a time domain and transmitting the at least one control signal, wherein the number of the at least one control signal is determined based on the number of available sequences for the control channel region and the number of bit carried by each control signal.

The number of available sequences may be equal to the number of subcarriers in one tile.

The sequences may be orthogonal to one another.

The control signal may be ACK/NACK (Acknowledgement/Non-acknowledgement) signal.

If the number of bit carried by each control signal is m, said each control signal may be mapped to one of 2 m sequences.

If the number of bit carried by each control signal is m, the number of the at least one control signal may be equal to the number of available sequences/2 m.

The plurality of tiles may be distributed in the time domain.

The plurality of tiles may be distributed in the frequency domain.

The at least one control signal may be repeatedly allocated in the plurality of the tiles.

The number of tiles in the control channel may be 3.

Each tile may consist of 2 consecutive subcarriers in a frequency domain on 2 OFDM symbols in a time domain.

According to an aspect of the present invention, a method of transmitting control signals in a wireless communication system comprises multiplexing the control signals into a tile consisting of a plurality of consecutive subcarriers in a frequency domain on a plurality of orthogonal frequency division multiplexing (OFDM) symbols in a time domain and transmitting the control signals, wherein, in the multiplexing of the control signals, the control signals are spread by using orthogonal spreading codes within the tile, and the number of bits of the spreading codes is determined based on a ratio of the number of control signals transmitted on the tile to the total number of subcarriers constituting the tile.

The number of bits of the spreading codes may be the same as the number of spreading codes.

The number of control signals to be multiplexed may depend on the number of bits of the spreading codes.

The spreading code may be obtained from one of a Hadamard code, a discrete Fourier transform (DFT) sequence, a Walsh code, a Zadoff-Chu (ZC) sequence, and a constant amplitude zero auto-correlation (CAZAC) sequence.

Since a control channel region can be configured in various manners, control signals can be adaptively transmitted. In addition, the control signals can be configured without channel estimation.

DESCRIPTION OF EXEMPLARY EMBODIMENTS

Figure 1:
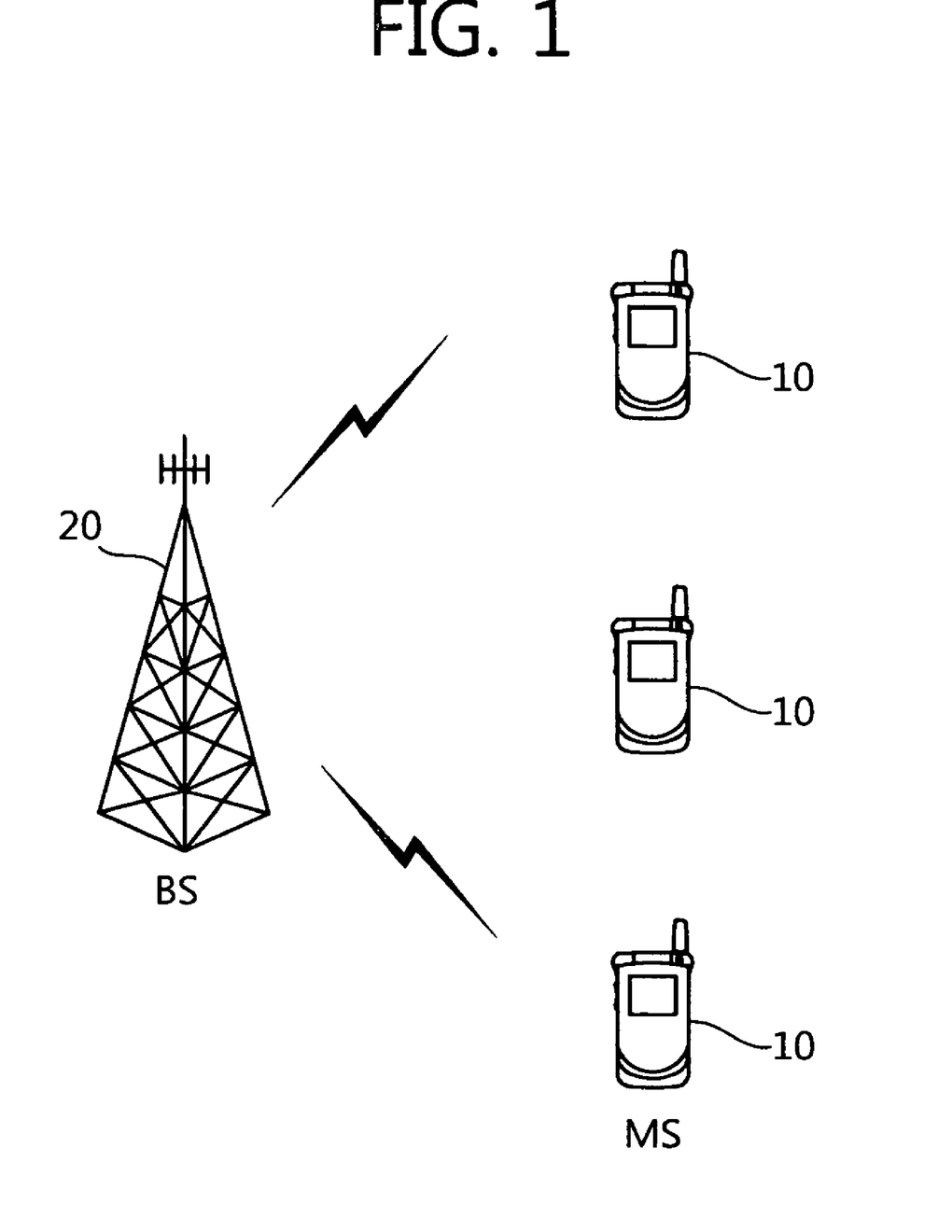
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one mobile station (MS) 10 and a base station (BS) 20. The MS 10 may be fixed or mobile, and may be referred to as another terminology, such as a user equipment (UE), a user terminal (UT), a subscriber station (SS), a wireless device, etc. The BS 20 is generally a fixed station that communicates with the MS 10 and may be referred to as another terminology, such as a node-B, a base transceiver system (BTS), an access point, etc. There are one or more cells within the coverage of the BS 20.

A downlink (DL) represents a communication link from the BS 20 to the MS 10, and an uplink (UL) represents a communication link from the MS 10 to the BS 20. In the DL, a transmitter may be a part of the BS 20, and a receiver may be a part of the MS 10. In the UL, the transmitter may be a part of the MS 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 2:
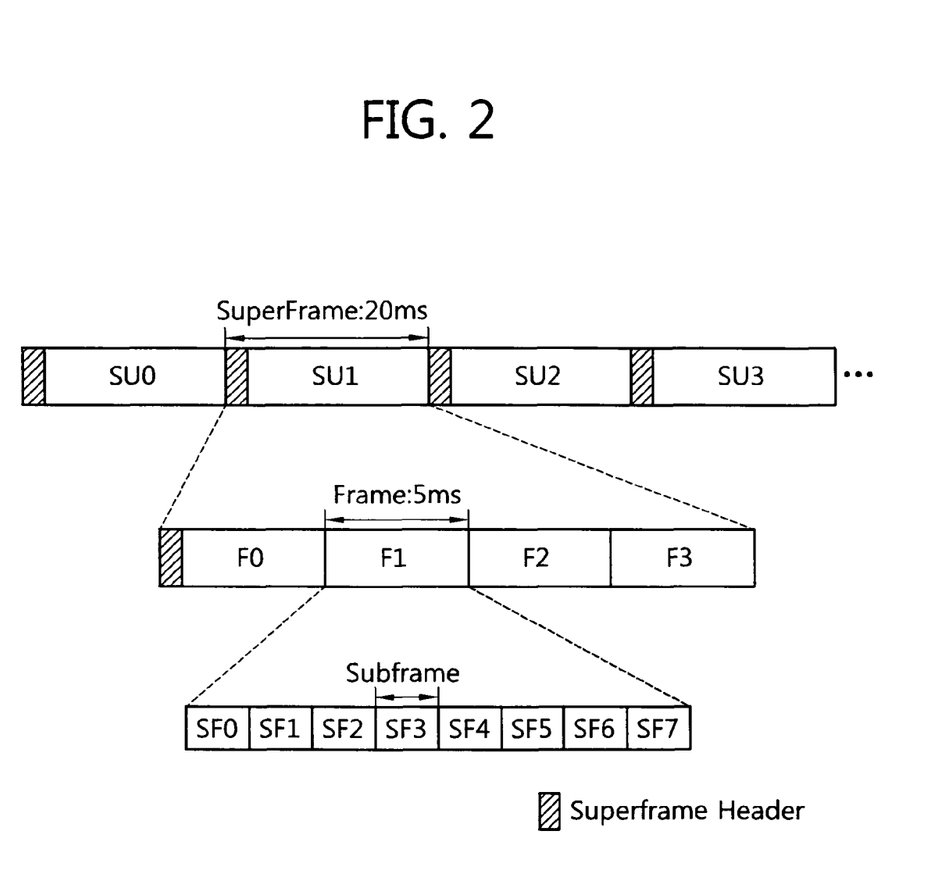
FIG. 2 shows an example of a hierarchical frame structure

FIG. 2 shows an example of a hierarchical frame structure. A frame is a data sequence used according to a physical specification in a fixed time duration.

Referring to FIG. 2, a frame hierarchy consists of a superframe, a radio frame (or a frame), and a subframe. The superframe includes one or more radio frames. The radio frame includes one or more subframes. The superframe includes one or more superframe based control regions. Hereinafter, the superframe based control region is referred to as a superframe header. The superframe header may be assigned to a first frame among a plurality of frames constituting the superframe. A common control channel may be allocated to the superframe header. The common control channel is used to transmit information regarding the radio frames constituting the superframe or control information (e.g., system information) that can be commonly used by all MSs. The system information is necessary information which must be known to perform communication between an MS and a BS. The BS periodically transmits the system information. The system information may be periodically transmitted every 20 to 40 milliseconds (ms). A size of the superframe can be determined by considering a transmission period of the system information. Although a size of each superframe is 20 ms in FIG. 2, this is for exemplary purposes only, and thus the present invention is not limited thereto.

When using OFDMA parameters exemplified in Table 1 below, one radio frame consists of 8 subframes. One subframe can be allocated for UL or DL transmission. There are three types of subframes as follows: 1) a Type-1 subframe consisting of 6 OFDM symbols; 2) a Type-2 subframe consisting of 5 OFDM symbols; and 3) a Type-3 subframe consisting of 7 OFDM symbols.

TABLE 1

| Transmission Bandwidth (MHz) | 5 | 10 | 20 |
|---|---|---|---|
| Over-sampling factor | | 28/25 | |
| Sampling Frequency (MHz) | 5.6 | 11.2 | 22.4 |
| FFT Size | 512.0 | 1024.0 | 2048 |
| Sub-carrier Spacing (kHz) | | 10.94 | |
| OFDM symbol time, Tu (us) | | 91.4 | |

| Cyclic Prefix (CP) | Ts (us) | OFDM symbols per Frame | Idle time (us) |
|---|---|---|---|
| Tg = ⅛ Tu | 91.4 + 11.42 = 102.82 | 102.82 | 48 64.64 |
| Tg = ¹⁄₁₆ Tu | 91.4 + 5.71 = 97.11 | 51 | 47.39 |

Although it is exemplified in FIG. 2 that one radio frame has a size of 5 ms, the present invention is not limited thereto. The radio frame can be applied to a time division duplexing (TDD) scheme and a frequency division duplexing (FDD) scheme. In the TDD scheme, a full frequency band is used for UL transmission and DL transmission when the UL transmission and the DL transmission are divided in a time domain. In the FDD scheme, the UL transmission and the DL transmission are simultaneously achieved while occupying different frequency bands. The radio frame may include a preamble, a frame control header (FCH), a DL-MAP, a UL-MAP, a burst region, etc. The preamble is used between the BS and the MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The UL-MAP is a region for transmitting a UL-MAP message. The UL-MAP message defines access to a UL channel. This implies that the UL-MAP message defines UL channel indication and/or control information.

Radio resources are limited, and thus, if a large amount of radio resources are used to transmit control signals, radio resources for data transmission are not sufficient. Accordingly, there is a need for a method of further effectively transmitting the control signals.

Figure 3:
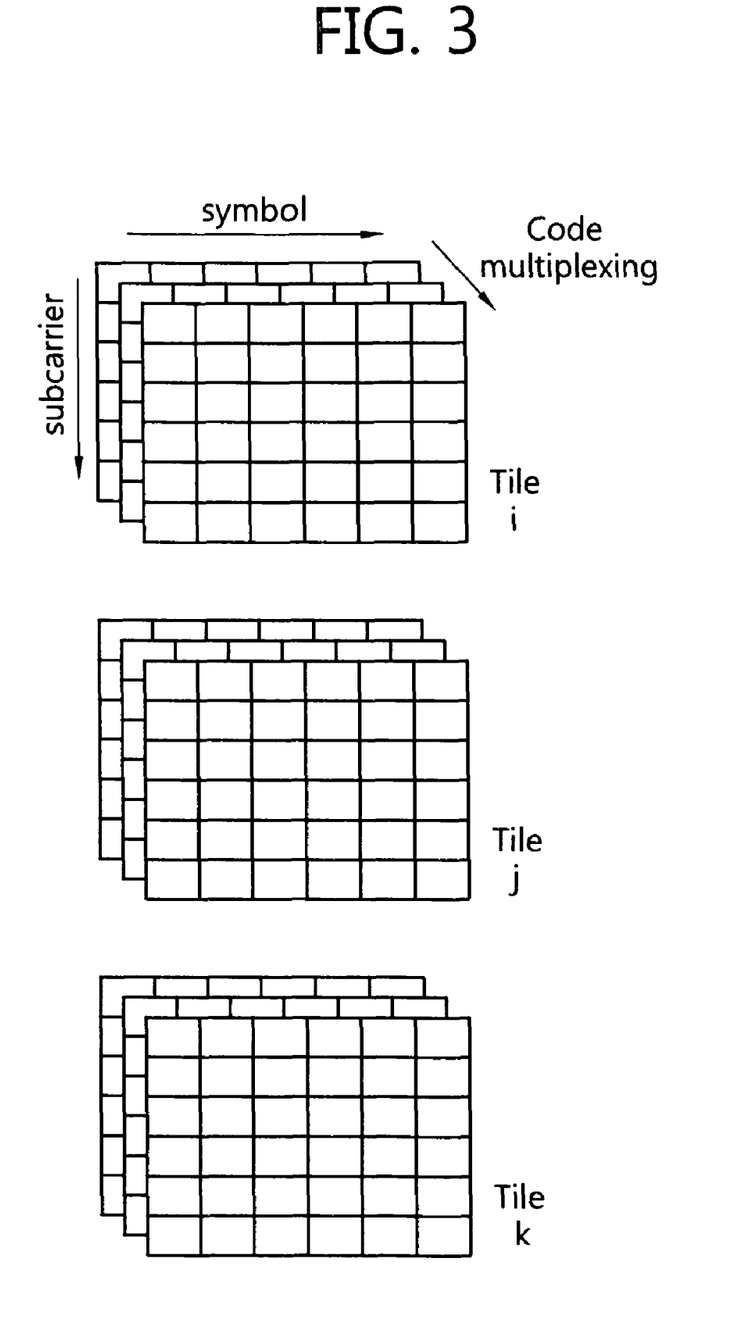
FIG. 3 shows an example of a method of multiplexing a plurality of control signals into one control channel region.

FIG. 3 shows an example of a method of multiplexing a plurality of control signals into one control channel region.

Referring to FIG. 3, the control channel region may be located in a region for UL transmission in a radio frame. One control channel region includes at least one tile. A plurality of tiles can be arranged consecutively or separately along a time axis, a frequency axis or a time/frequency axis in one control channel region.

Although it is shown in FIG. 3 that a tile has a format such as a time*frequency=6*6, and three tiles constitute one control channel region, the present invention is not limited thereto. That is, one tile can have various formats such as a 'time*frequency=3*4, 3*3, 4*3, 6*4, 3*6, 6*2, 2*6, etc.'

In addition, although it is shown in FIG. 3 that a plurality of control signals are multiplexed into one control channel region by using a code division multiplexing (CDM) scheme in which orthogonal spreading codes are multiplied by each control signal, the control signals may also be multiplexed by using a time division multiplexing (TDM) scheme or a frequency division multiplexing (FDM) scheme.

In this manner, waste of radio resources can be avoided by allocating a plurality of control signals to one control channel region. Herein, the plurality of control signals imply a plurality of control signals intended to be transmitted by one MS or a plurality of control signals intended to be transmitted by a plurality of MSs. That is, one control channel region can be allocated to a plurality of MSs so that control signals of the plurality of MSs are multiplexed into one control channel region, or one control channel region can be allocated to one MS so that a plurality of control signals of the MS are multiplexed into one control channel region.

Hereinafter, a method of multiplexing control signals into a control channel region according to a CDM spreading scheme will be described. In the CDM spreading scheme, the control signals are spread by using orthogonal spreading codes and are then carried on a tile. The spreading codes spread the control signals in a time domain or a frequency domain. The spreading codes may be orthogonal codes such as a Hadamard code, a discrete Fourier transform (DFT) sequence, a Walsh code, a Zadoff-Chu (ZC) sequence, a constant amplitude zero auto-correction (CAZAC) sequence etc.

The ZC sequence is one of CAZAC sequences and can be expressed by Equation 1 below.

$$c(k) = \exp\left\{-\frac{j\pi Mk(k+1)}{N}\right\}, \text{ when } N \text{ is odd number} \quad \text{[Equation 1]}$$

$$c(k) = \exp\left\{-\frac{j\pi Mk^2}{N}\right\}, \text{ when } N \text{ is even number}$$

Herein, $c(k)$ denotes a $k^{th}$ element of a ZC sequence having an index M, and N denotes a length of the ZC sequence. The index M is a natural number less than or equal to N, where M and N are relatively prime to each other. Each MS can be identified by using a ZC sequence having a different circular shift value. That is, a plurality of control signals can be identified by using different circular shift values. The number of available circular shift values may vary depending on a channel delay spread. This is for exemplary purposes only, and thus other sequences having an excellent correlation property can also be used.

Herein, the control signals are signals transmitted by an MS to a BS to facilitate scheduling performed by the BS. Examples of the control signals include a channel quality indicator (CQI) used when the MS reports a channel condition to the BS, an acknowledgment (ACK)/non-acknowledgement (NACK) signal that is a response for data transmission, a precoding matrix indicator (PMI) that is preceding information used in a multiple antenna system, a rank indicator (RI), etc. However, the present invention is not limited thereto. Control information consisting of one or more bits are subjected to encoding and modulation to generate control signals $S_k$ (k=0, 1, . . . , K).

Figure 4:
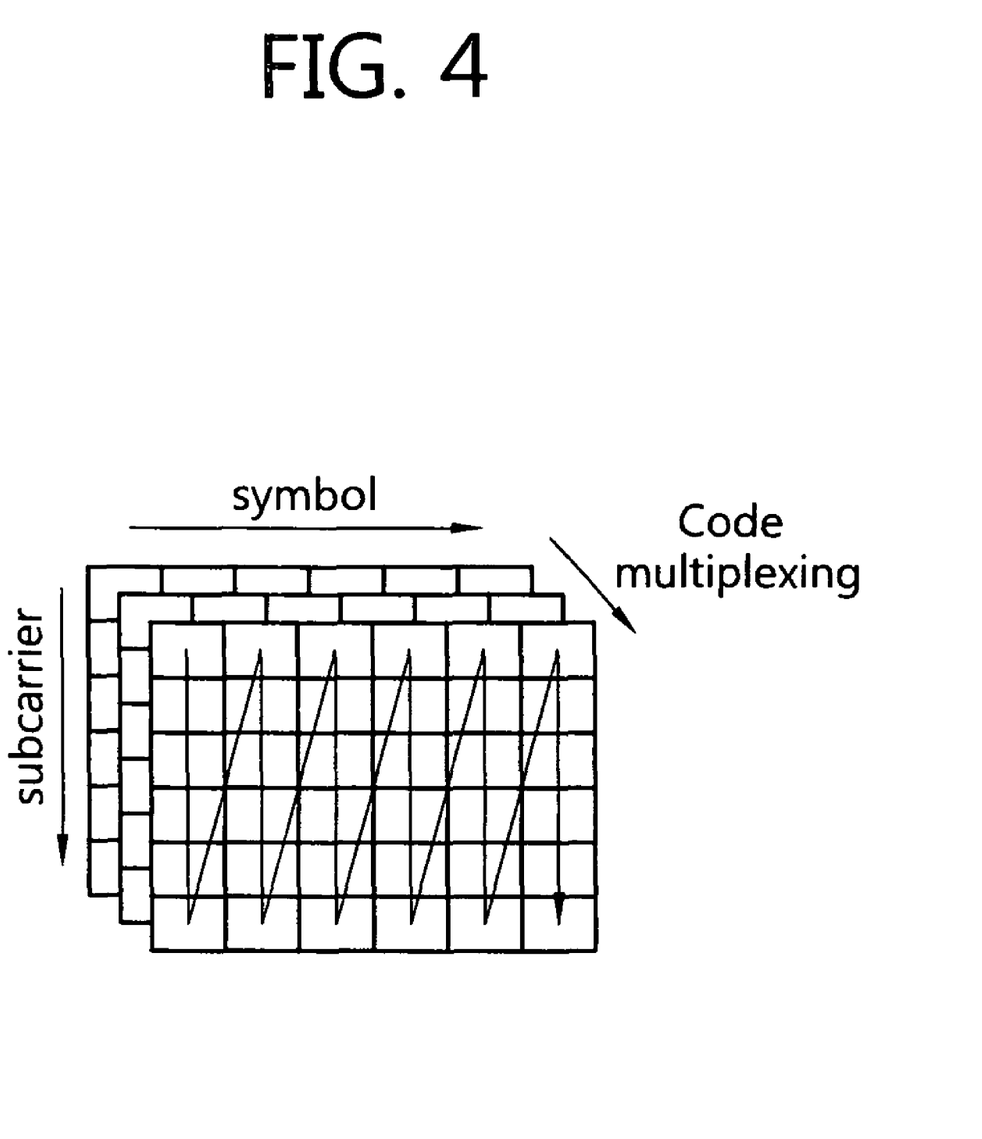
FIG. 4 is a diagram showing a method of multiplexing control signals into a control channel region according to an embodiment of the present invention.

FIG. 4 is a diagram showing a method of multiplexing control signals into a control channel region according to an embodiment of the present invention.

Referring to FIG. 4, it is assumed that one control signal is allocated within one tile. Although the tile has a format of 'time*frequency=6*6', the present invention is not limited thereto. For example, the tile may have a format of 'time*frequency=3*6, 6*1, or 1*6'.

If a plurality of control signals are multiplexed into one control channel region according to a CDM scheme, the control signals can be spread by using orthogonal spreading codes and then can be carried on a tile.

If the number of control signals allocated within one tile is S and the number of subcarriers constituting the tile is N, each control signal can be spread in N/S subcarriers. That is, the maximum number of bits of the spreading codes is N/S, and thus N/S control signals can be multiplexed. In FIG. 4, the number of control signals allocated within one tile is 1, and the number of subcarriers constituting the tile is 36. Therefore, the control signal is spread within 36 subcarriers. As shown in FIG. 4, the control signal may be sequentially spread in a subcarrier direction and thereafter may be spread in a subcarrier direction on an adjacent time axis. The other way around is also possible. Alternatively, 36 control signals may be multiplexed by using 36 spreading codes (i.e., 36 bits).

In FIG. 4, coherent detection is not performed since a reference signal (or a pilot) is not transmitted, thereby disabling channel estimation. However, non-coherent detection can be performed since respective control signals use orthogonal spreading codes. The coherent detection is a method of detecting a signal after performing channel estimation by using the pilot or the reference signal. The non-coherent detection is a method of detecting a signal without performing channel estimation. When the control signals are multiplexed as shown in FIG. 4, the control signals can be effectively transmitted by using limited radio resources. The same control signal can be repetitively transmitted by allocating one or more tiles of FIG. 4, thereby increasing diversity.

Figure 5:
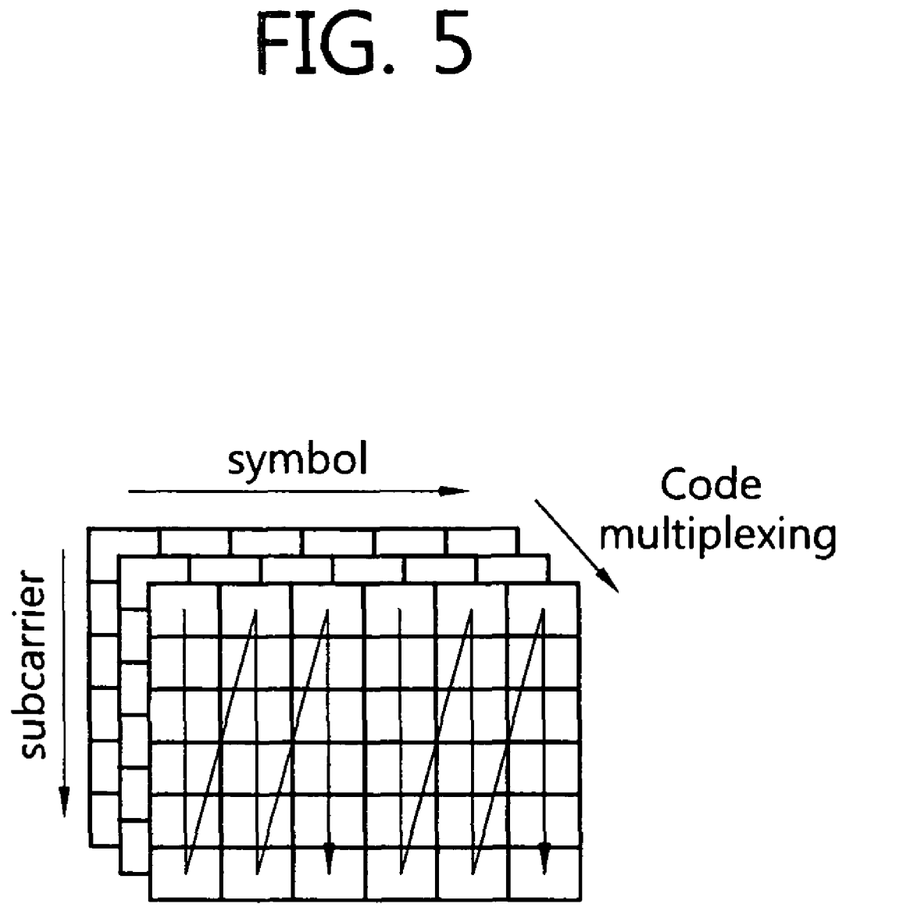
FIG. 5 is a diagram showing a method of multiplexing control signals into a control channel region according to another embodiment of the present invention.

FIG. 5 is a diagram showing a method of multiplexing control signals into a control channel region according to another embodiment of the present invention.

Referring to FIG. 5, two control signals are allocated within one tile. Although the tile has a format of 'time*frequency=6*6', the present invention is not limited thereto. For example, the tile may have a format of 'time*frequency=3*6, 2*6, or 6*2'.

In FIG. 5, the number of control signals allocated within one tile is 2, and the number of subcarriers constituting the tile is 36. Therefore, each control signal is spread within 18 (i.e., 36/2) subcarriers. As shown in FIG. 5, each control signal may be sequentially spread in a subcarrier direction, and thereafter may be spread in a subcarrier direction on an adjacent time axis. In addition, if the number of control signals allocated within one tile is 2, spreading of one control signal may start from a subcarrier next to a subcarrier at which spreading of another control signal ends. 18 control signals can be multiplexed by using 18 spreading codes (i.e., 18 bits). Herein, the same spreading code is used for two control signals.

In FIG. 5, non-coherent detection can be performed since respective control signals are multiplexed by using orthogonal spreading codes. Diversity of the control signals is increased by allocating one or more tiles of FIG. 5.

Herein, a plurality of (i.e., three or more) control signals may be transmitted within one tile. Even if the plurality of control signals are transmitted, the control signals can be multiplexed as shown in the method of FIG. 4 and FIG. 5. For example, if four control signals are transmitted within one tile, each control signal is spread within 9 (i.e., 36/4) subcarriers. In addition, 9 control signals can be multiplexed by using 9 spreading codes (i.e., 9 bits). The more the control signals allocated within one tile, the narrower the spreading interval.

Figure 6:
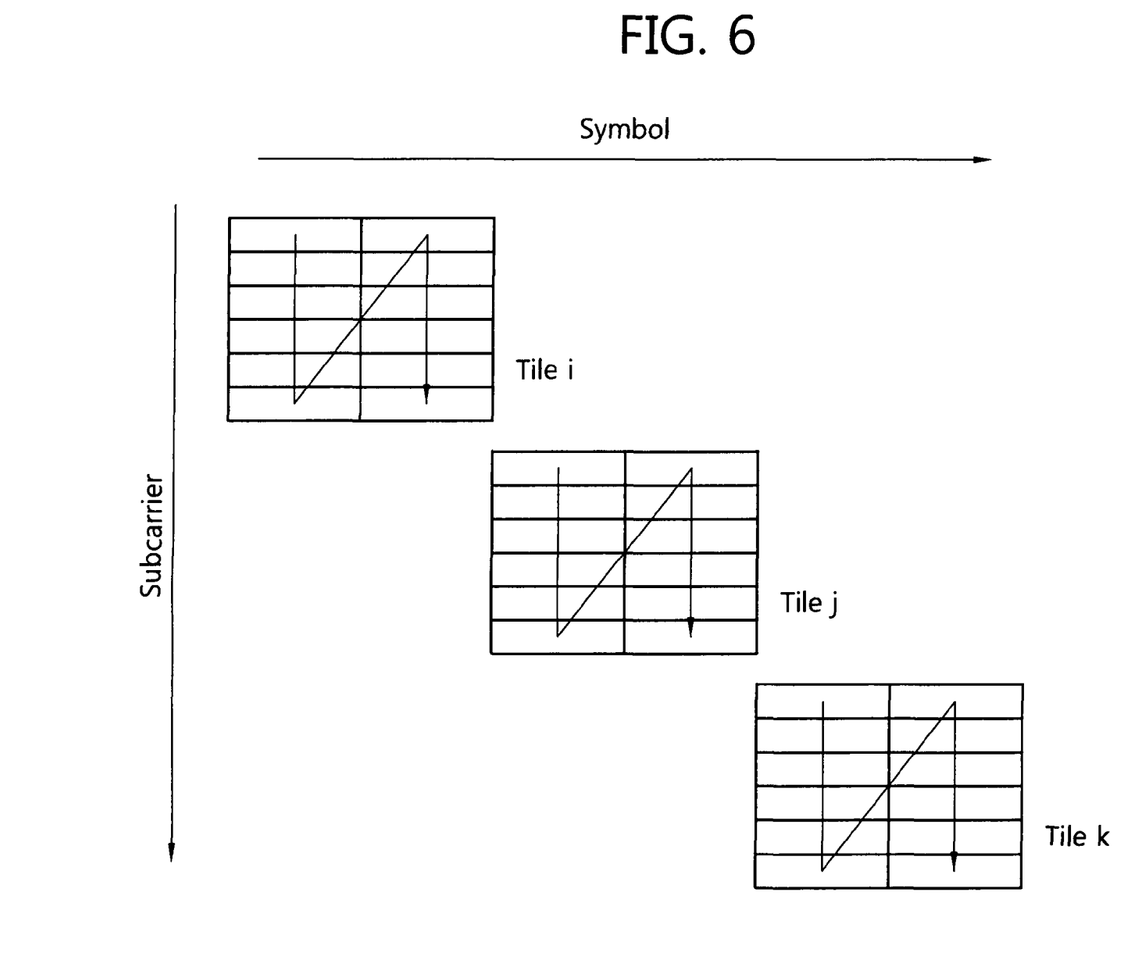
FIG. 6 is a diagram showing a method of multiplexing control signals into a control channel region according to another embodiment of the present invention.

FIG. 6 is a diagram showing a method of multiplexing control signals into a control channel region according to another embodiment of the present invention.

Referring to FIG. 6, three tiles having a format of 'time*frequency=2*6' are arranged consecutively or separately along a time axis or a frequency axis to constitute one control channel region. However, the present invention is not limited thereto. That is, one tile may have various formats such as 'time*frequency=3*6, 6*2, 6*6, etc.', and three tiles may be arranged consecutively or separately along the time axis or the frequency axis to constitute one control channel region.

In FIG. 6, the number of control signals allocated within one tile is 1, and the number of subcarriers constituting the tile is 12. Therefore, the control signal is spread by using an orthogonal spreading code within 12 (i.e., 12/1) subcarriers, and this is repeated in 3 tiles (i.e., i, j, and k). As shown in FIG. 6, each control signal may be sequentially spread in a subcarrier direction, and thereafter may be spread in a subcarrier direction on an adjacent time axis. In addition, each control signal may be sequentially spread in a time-axis direction and thereafter be spread in an adjacent subcarrier direction. 12 control signals can be multiplexed into one tile by using 12 orthogonal spreading codes (i.e., 12 bits).

In FIG. 6, non-coherent detection can be performed since respective control signals are multiplexed by using orthogonal spreading codes. Since the control signals are repetitively allocated to a plurality of tiles, diversity of the control signals is increased.

Hereinafter, a method of multiplexing control signals into a control channel region by using a CDM sequence scheme will be described according to an embodiment of the present invention.

First, L orthogonal sequences are generated, wherein the number of bits of the orthogonal sequences is equal to the total number L of subcarriers constituting all tiles included in one control channel region. For example, if one control channel region includes three tiles and each tile has a format of 'time*frequency=6*6', the total number of subcarriers constituting the control channel region is 108. Therefore, 108 orthogonal sequences can be generated. Next, the orthogonal sequence (hereinafter, simply referred to as 'sequence') is allocated to the control signals. One control signal can be allocated to each sequence.

Table 2 below shows an example of allocating control signals to sequences.

TABLE 2

| Sequence 1 | MS 1 |
|---|---|
| Sequence 2 | |
| Sequence 3 | MS 2 |
| Sequence 4 | MS 3 |
| Sequence 5 | |

In Table 2 above, it is assumed that the MS 1 transmits two control signals, the MS 2 transmits one control signal, and the MS 3 transmits two control signals. Therefore, the control signals transmitted by the MS 1 can be allocated to a sequence 1 and a sequence 2, the control signal transmitted by the MS 2 can be allocated to a sequence 3, and the control signals transmitted by the MS 3 can be allocated to a sequence 4 and a sequence 5.

Table 3 below shows another example of allocating control signals to sequences.

TABLE 3

| Sequence 1 | $1^{st}$ control signal | ACK of $1^{st}$ control signal |
|---|---|---|
| Sequence 2 | | NACK of $1^{st}$ control signal |
| Sequence 3 | $2^{nd}$ control signal | ACK of $2^{nd}$ control signal |
| Sequence 4 | | NACK of $2^{nd}$ control signal |

In Table 3 above, it is assumed that two ACK/NACK control signals are transmitted on one control channel region according to the CDM sequence scheme. Two sequences are required to distinguish ACK and NACK from one ACK/NACK control signal. Therefore, the $1^{st}$ control signal can use a sequence 1 for ACK transmission and can use a sequence 2 for NACK transmission. In addition, the $2^{nd}$ control signal can use a sequence 2 for ACK transmission and can use a sequence 4 for NACK transmission. As described above, if L sequences are generated in one control channel region, L/2 ACK/NACK control signals can be multiplexed and transmitted on the control channel region.

The method of allocating the ACK/NACK control signals of Table 3 can also be applied to transmission of other control signals. That is, since the ACK/NACK control signal has a length of 1 bit, $2^1$ sequences are required. As such, if a control signal has a length of m bits, $2^m$ sequences are required. Therefore, if three control signals having a length of m bits are transmitted on one control channel region, $3*2^m$ sequences are required.

The sequences for allocating the control signals are not limited to the orthogonal sequences. That is, pseudo-orthogonal sequences may be generated and used to allocate the control signals. For example, the pseudo-orthogonal sequence may be characterized in that sequences are not orthogonal to one another as a whole while sequences within each tile have orthogonality.

When the CDM sequence scheme is used to allocate control signals in a control channel region according to an embodiment of the present invention, channel estimation is not necessary. That is, since a pilot or a reference signal is not transmitted, coherent detection such as channel estimation between a BS and an MS cannot be performed. However, non-coherent detection can be performed since control signals use orthogonal sequences.

The present invention may be implemented by hardware, software, or their combination. In implementing hardware, hardware may be implemented by ASIC (application specific integrated circuit), DSP (digital signal processing), PLD (programmable logic device), FPGA (field programmable gate array), processor, controller, microprocessor, other electronic unit which have been designed to perform the above-described functions, or their combination. In implementing software, software may be implemented by a module that performs the above-described functions. The software may be stored in the memory unit and executed by the processor. As the memory unit or the processor, various units well known to the person in the art can be employed.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method of transmitting a plurality of control signals in a wireless communication system, the method comprising:
    allocating the control signals in a control channel region comprising at least one tile, each tile consisting of a plurality of consecutive subcarriers in a frequency domain on a plurality of orthogonal frequency division multiplexing (OFDM) symbols in a time domain; and
    transmitting the control signals,
    wherein the control signals are allocated within one tile, each of the control signals is spread within one tile, a spreading code for each of the control signals is selected from orthogonal spreading codes, and the control signal is ACK/NACK (Acknowledgement/Non-acknowledgement) signal.

2. The method of claim 1, wherein a maximum number of bits of the spreading code is N/S, where S denotes a number of control signals allocated within one tile, and N denotes a number of subcarrier constituting one tile.

3. The method of claim 1, wherein the spreading code for each of the control signals is selected from a Walsh code.

4. The method of claim 1, wherein each of the control signals is sequentially spread in a frequency axis or a time axis.

5. The method of claim 1, wherein one spread control signal starts from a subcarrier next to a subcarrier at which another spread control signal ends.

6. The method of claim 1, wherein the plurality of tiles are distributed in the time domain.

7. The method of claim 1, wherein the plurality of tiles are distributed in the frequency domain.

8. The method of claim 1, wherein at least one control signal is repeatedly allocated in the plurality of the tiles.

9. The method of claim 1, wherein the number of tiles in the control channel region is 3.

10. The method of claim 1, wherein each tile consisting of 2 consecutive subcarriers in a frequency domain on 6 OFDM symbols in a time domain.

11. A terminal for transmitting a plurality of control signals in a wireless communication system, the terminal comprising:
    a processor configured for allocating the control signals in a control channel region comprising at least one tile, each tile consisting of a plurality of consecutive subcarriers in a frequency domain on a plurality of orthogonal frequency division multiplexing (OFDM) symbols in a time domain; and
    a transmitter configured for transmitting the at least one control signal,
    wherein the control signals are allocated within one tile, each of the control signals is spread within one tile, a spreading code for each of the control signals is selected from orthogonal spreading codes, and the control signal is ACK/NACK (Acknowledgement/Non-acknowledgement) signal.

12. The terminal of claim 11, wherein a maximum number of bits of the spreading code is N/S, where S denotes a number of control signals allocated within one tile, and N denotes a number of subcarrier constituting one tile.

13. The terminal of claim 11, wherein the spreading code for each of the control signals is selected from a Walsh code.

14. The terminal of claim 11, wherein each of the control signals is sequentially spread in a frequency axis or a time axis.

15. The terminal of claim 11, wherein one spread control signal starts from a subcarrier next to a subcarrier at which another spread control signal ends.

16. The terminal of claim 11, wherein the plurality of tiles are distributed in the time domain.

17. The terminal of claim 11, wherein the plurality of tiles are distributed in the frequency domain.

18. The terminal of claim 11, wherein at least one control signal is repeatedly allocated in the plurality of the tiles.

19. The terminal of claim 11, wherein the number of tiles in the control channel region is 3.

20. The terminal of claim 11, wherein each tile consisting of 2 consecutive subcarriers in a frequency domain on 6 OFDM symbols in a time domain.

* * * * *